United States Patent
Taylor et al.

(10) Patent No.: US 7,961,742 B2
(45) Date of Patent: Jun. 14, 2011

(54) CABLE MODEM TERMINATION SYSTEM HAVING A GATEWAY FOR TRANSPORTING OUT-OF-BAND MESSAGING SIGNALS

(75) Inventors: Kevin N. Taylor, Parker, CO (US); Doug Jones, Boulder, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 720 days.

(21) Appl. No.: 10/570,830

(22) PCT Filed: Sep. 7, 2004

(86) PCT No.: PCT/US2004/028909
§ 371 (c)(1),
(2), (4) Date: Mar. 6, 2006

(87) PCT Pub. No.: WO2005/024589
PCT Pub. Date: Mar. 17, 2005

(65) Prior Publication Data
US 2006/0285544 A1    Dec. 21, 2006

Related U.S. Application Data

(60) Provisional application No. 60/501,231, filed on Sep. 5, 2003.

(51) Int. Cl.
*H04L 12/28* (2006.01)
(52) U.S. Cl. ........ 370/401; 370/352; 370/400; 370/465; 725/105; 725/121; 725/120
(58) Field of Classification Search .................. 370/392, 370/474, 487, 352, 450, 395.3, 509; 375/222; 709/224, 232, 235, 352, 230; 725/105, 125, 128, 129
See application file for complete search history.

(56) References Cited

U.S. PATENT DOCUMENTS

| | | | |
|---|---|---|---|
| 6,853,680 B1 * | 2/2005 | Nikolich | 375/222 |
| 7,194,756 B2 | 3/2007 | Addington | |
| 7,287,257 B2 | 10/2007 | Meza | |
| 7,324,515 B1 * | 1/2008 | Chapman | 370/392 |
| 7,349,430 B1 * | 3/2008 | Chapman | 370/468 |
| 7,359,434 B2 | 4/2008 | Shahar | |
| 2001/0033585 A1 | 10/2001 | Lazarus et al. | |
| 2002/0001316 A1 | 1/2002 | Hornsby et al. | |
| 2002/0012353 A1 | 1/2002 | Gerszberg et al. | |
| 2002/0019984 A1 * | 2/2002 | Rakib | 725/111 |
| 2002/0071440 A1 | 6/2002 | Cerami | |
| 2002/0143565 A1 | 10/2002 | Headings | |
| 2002/0191635 A1 | 12/2002 | Chow et al. | |
| 2003/0048380 A1 | 3/2003 | Tamura | |
| 2003/0120819 A1 * | 6/2003 | Abramson et al. | 709/250 |
| 2003/0200548 A1 | 10/2003 | Baran et al. | |
| 2004/0030804 A1 * | 2/2004 | Wiget et al. | 709/245 |

(Continued)

OTHER PUBLICATIONS

International Search Report for corresponding International Application No. PCT/US04/28909, 1 page.

(Continued)

*Primary Examiner* — Pankaj Kumar
*Assistant Examiner* — Anez Ebrahim
(74) *Attorney, Agent, or Firm* — Banner & Witcoff, Ltd.

(57) ABSTRACT

A Cable Modem Termination System (CMTS, 42, FIG. 1) having a gateway configured to output signals over tunnels, wherein the tunnels are one way and out-of-band messages (FIG. 1) are sent over said tunnels (FIG. 1).

43 Claims, 3 Drawing Sheets

U.S. PATENT DOCUMENTS

2004/0261126 A1   12/2004  Addington
2005/0177861 A1*  8/2005  Ma et al. .................. 725/135
2005/0228877 A1   10/2005  Monitzer
2008/0010300 A1*  1/2008  Bunn et al. ................ 707/10

OTHER PUBLICATIONS

International Search Report for related International Application No. PCT/US04/28908, mailed Aug. 26, 2005, 1 page.

* cited by examiner

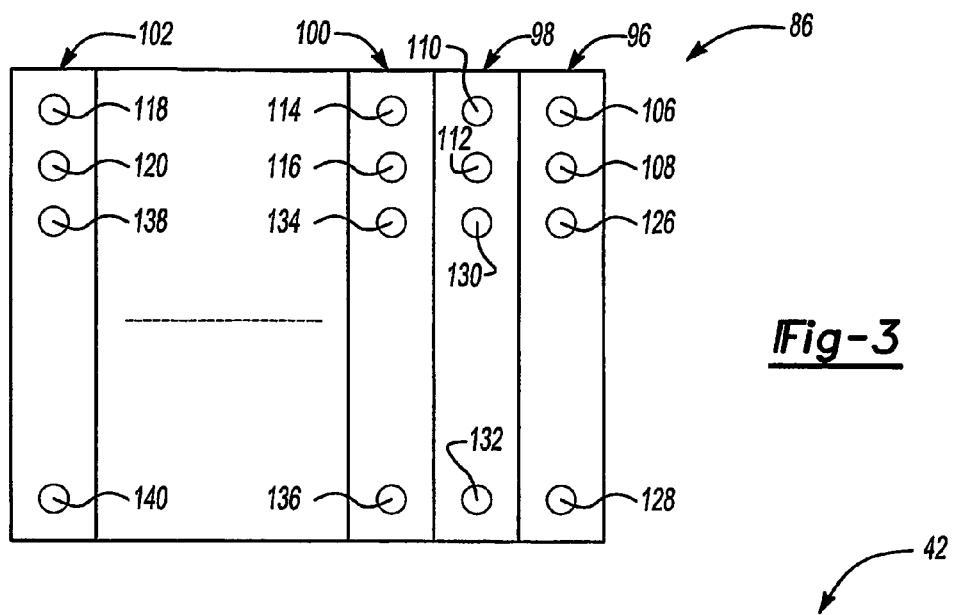
_Fig-3_
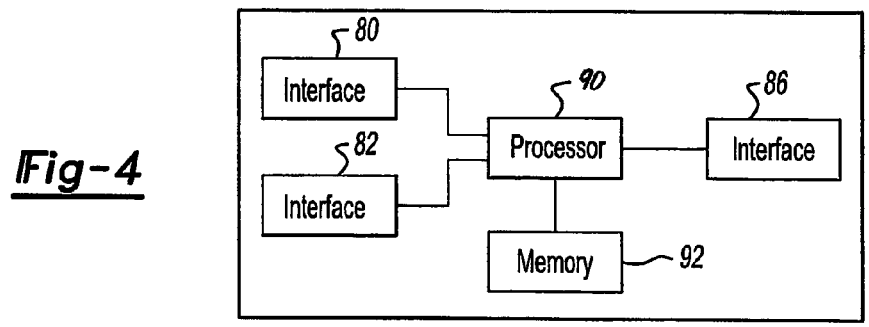
_Fig-4_
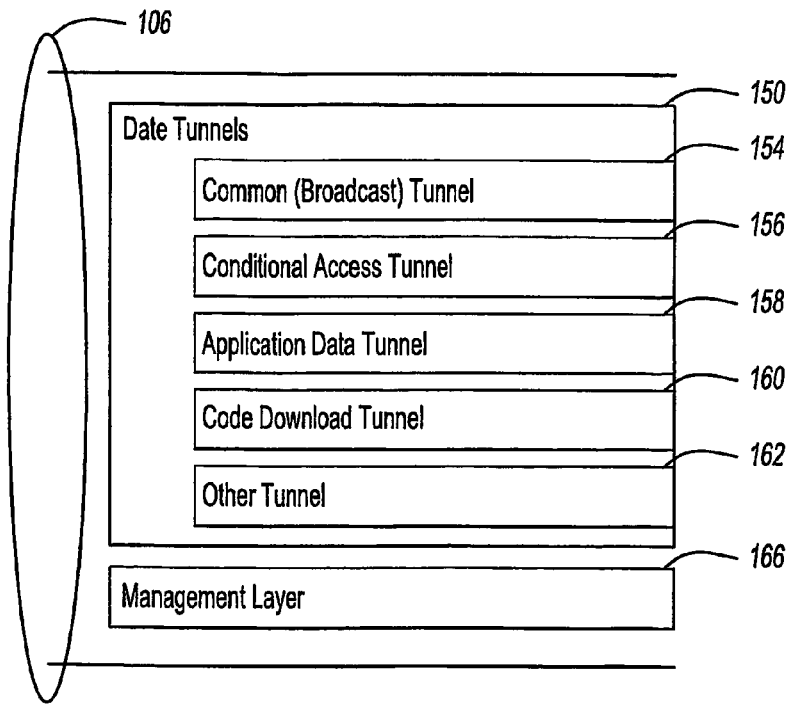
_Fig-5_

CABLE MODEM TERMINATION SYSTEM HAVING A GATEWAY FOR TRANSPORTING OUT-OF-BAND MESSAGING SIGNALS

CROSS-REFERENCE TO RELATED APPLICATIONS

This application claims priority to PCT application Ser. No. PCT/US2004/028909 filed Sep. 7, 2004, which claims the benefit of U.S. provisional application Ser. No. 60/501,231 filed Sep. 5, 2003.

BACKGROUND OF THE INVENTION

1. Field of the Invention

The present invention relates to Cable Modem Termination Systems (CMTSs) of the type having a gateway for transporting out-of-band (OOB) messaging signals.

2. Background Art

A cable modem termination system (CMTS) is generally a system located at a headend or other location of a cable service provider for transporting data packets from one location to another, such as between an internet service provider (ISP) and a subscriber station. In particular, the CMTS may be configured for downstream communication such that it is configured to receive IP packets from the ISP, to convert the IP packets to digital cable packets, and to deliver the digital cable packets to the subscriber station. In addition, the CMTS may be configured for upstream communication such that it is configured to receive digital cable packets from the subscriber station, to convert the digital cable packets to IP packets, and to deliver the IP packets to the ISP.

A need exists for a CMTS to include capabilities for transporting OOB messaging signals.

SUMMARY OF THE INVENTION

The present invention contemplates a number of features and configurations for the CMTS, including the CMTS having a gateway configured to output signals on at least two types of data tunnels for transfer over a cable network to Customer Premises Equipment (CPE). Each data tunnel is preferably characterized as a one-way data stream of out-of-band (OOB) messaging signals and each type of data tunnel is preferably associated with a different type of OOB messaging signals such that different types of data tunnels transfer different types of OOB messages.

In one aspect of the present invention, the system includes a CMTS configured to include a gateway configured to output signals on a plurality of data tunnels for transfer over a cable network to Customer Premises Equipment (CPE). Each data tunnel is preferably characterized as a one-way data stream of out-of-band (OOB) messaging signals. The CMTS preferably includes a plurality of output ports for transferring the OOB messaging signals from the gateway to the cable network, wherein each output port is capable of transferring different types of OOB messaging signals.

The above features and advantages, along with other features and advantages of the present invention, are readily apparent from the following detailed description of the invention when taken in connection with the accompanying drawings.

BRIEF DESCRIPTION OF THE DRAWINGS

FIG. 3 illustrates a Cable Modem Termination System (CMTS) in accordance with one aspect of the present invention;

FIG. 4 illustrates an interface of the CMTS in accordance with one aspect of the present invention;

FIG. 5 illustrates a data tunnel in accordance with one aspect of the present invention.

DETAILED DESCRIPTION OF THE PREFERRED EMBODIMENT(S)

Figure 1:
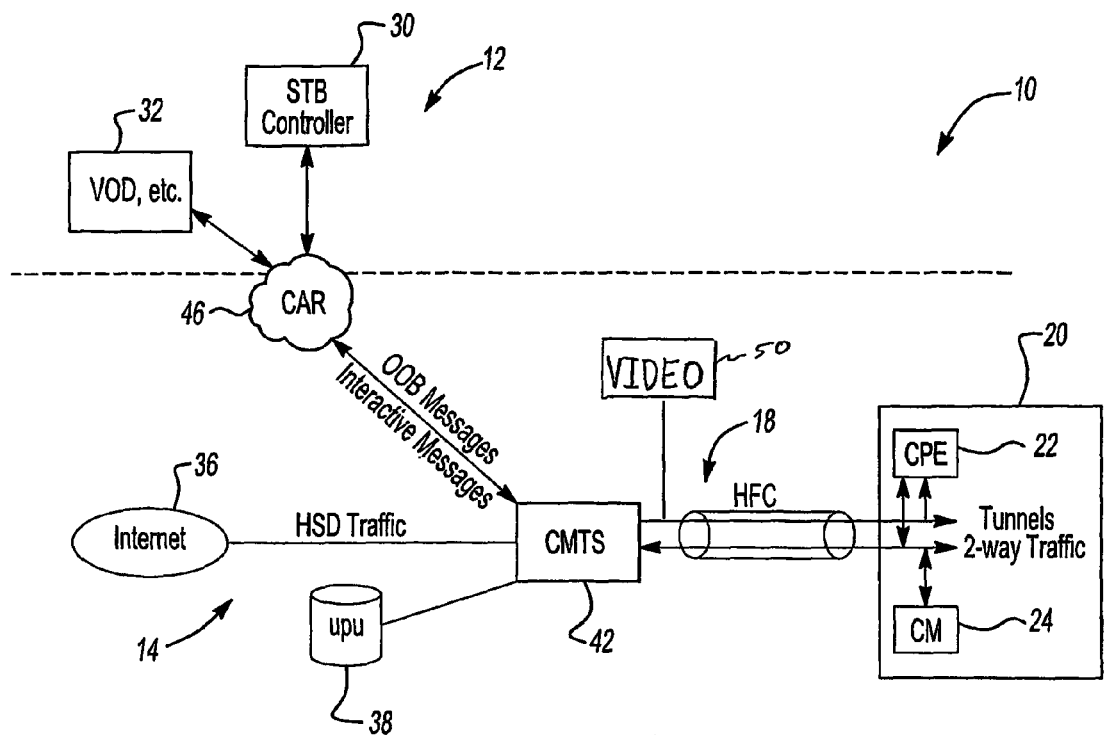
FIG. 1 illustrates a cable system in accordance with one aspect of the present invention.

FIG. 1 illustrates a cable system 10 in accordance with one aspect of the present invention. The system 10 includes a management network 12 and a High Speed Data (HSD) network 14 that respectively provide management and HSD services over a hybrid fiber coax (HFC) 18, or other communication medium, to a subscriber station 20, which includes Customer Premises Equipment (CPE) 22 and a cable modem (CM) 24.

The management network 12 generally comprises two portions, a control portion 30 and an application portion 32. The control portion 30 includes a settop box (STB) controller to control, provision, manage, and secure the CPE 22 through out-of-band (OOB) messaging. The application portion 32 provides applications to the CPE 22, such as video on demand (VOD), interactive television (iTV), and other services.

The HSD network 14 provides data services for the system 10, including services for the CM 24 to access the Internet 36. It includes a network provisioning unit (NPU) 38 having capabilities for Dynamic Host Configuration Protocol (DHCP), Trivial File Transfer Protocol (TFTP), and the like, in addition to a Domain Name System (DNS) server.

The system 10 includes a cable modem termination system (CMTS) 42 to send and receive signals to and from the CPE 22 and the CM 24 over the HFC 18. In general, the CMTS 42 transfers IP packets from the HSD network 14 and the management network 12 to the CPE 22 and CM 24 for processing. Preferably, the signals are outputted from the CMTS 42 on downstream output channels, which preferably include one-way output data tunnels, such as for OOB messaging. In addition, the CMTS 42 is configured to receive signals from the CPE 22 and the CM 24 to support two-way communication therewith, such as for transfer of IP packets from the CPE 22 and/or the CM 24 to the Internet 36 and/or the VOD or STB controller portions 32 and 30.

The system 10 includes a conditional access router (CAR) 46 to connect the management network 12 to the CMTS 42. The CAR 46 transports signals therebetween using IP protocols and provides firewall separation for the VOD or STB controller portions 32 and 30 from the HSD network 14, enhancing security from any devices attempting to associate with devices and signaling on the management network 12. In operation, signaling traffic transported between the management network 12 and the CMTS 42 may be wrapped into addressable packets, such as Ethernet, IP, or other packets.

The system 10 includes a video unit 50 for delivering video signals to the subscriber station 20 over the HFC 18. The video unit 50 can deliver any number of video signals, including network television, cable television, pay-per-view, video on demand, and the like.

Figure 2:
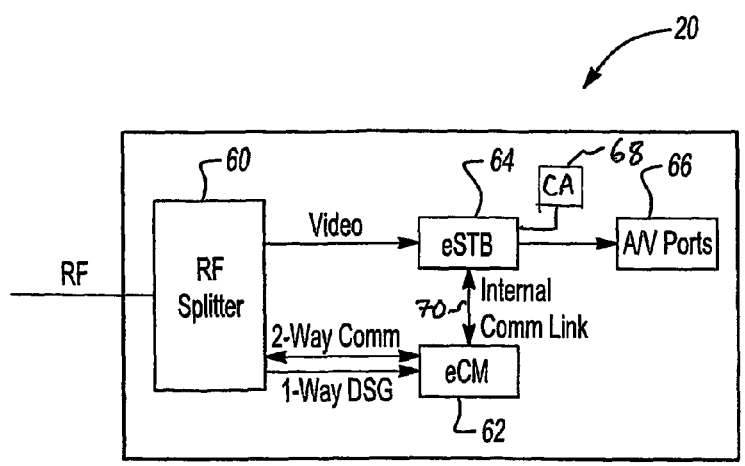
FIG. 2 illustrates Customer Premises Equipment (CPE) in accordance with one aspect of the present invention.

FIG. 2 illustrates the CPE 22 in accordance with one aspect of the present invention. The CPE 22 is preferably configured to communicate with the CMTS 42 through digital cable signals, such as through signaling defined by the Data Over Cable Service Interface Specification (DOCSIS) and/or through other protocols authorized through DHCP registration.

The CPE 22 includes a radio frequency (RF) splitter 60, an embedded cable modem (eCM) 62, an embedded set-top box (eSTB) 64, an audio visual (A/V) port 66, and an optional conditional access (CA) unit 68. The RF splitter 60 splits the RF signal into two portions—one for OOB control functions and two-way application traffic and one for video delivery. The OOB and two-way application traffic is relayed to the eCM 62 and the video is relayed to the eSTB 64.

The eSTB 64 outputs video and other media signals to a media output device (not shown) or other device connected to the A/V port 66, such as to a television (TV), digital video recorder (DVR), personal video recorder (PVR), or the like.

The eCM 62 processes control and other non-media signals, such as DOCSIS and other IP packets, and bridges or relays the signals to the eSTB 64 through an internal communications link 70. In particular, the communications link 70 is used to transfer data tunnels tuned to by the eCM 62 to the eSTB 64 so that OOB messaging signals can be delivered to the eSTB 64 for processing.

The CA unit 68 provides conditional access control for the subscriber station 20. It can be a CableCard, SmartCard, or other item for controlling security and access to the data, video, and control signals transmitted over the HFC 18. It is illustrated as a standalone item, however, it can be included with or embedded on the eSTB 64 or the eCM 62 to perform similar functions.

The eCM 62, eSTB 64, and CA unit 68 are logically separate entities, however, they may physically share hardware and software. Other items, such as control logic and applications may be included on the CPE 22 for controlling operation of the eSTB 64 and/or the eCM 62.

FIG. 3 illustrates the CMTS 42 in accordance with one aspect of the present invention. The CMTS 42 includes a first interface 80 and a second interface 82 for sending and receiving signals to and from the management and HSD networks 12, 14, respectively. The CMTS 42 further includes a third interface 86 for sending and receiving signals to and from the CPE 22 and CM 24 over the HFC 18. A processor 90, which is in communication with a memory 92, processes the signals for communication with the first, second, and third interfaces 80, 82, 86 according to instructions stored on the memory 92.

FIG. 4 illustrates the third interface 86 in accordance with one aspect of the present invention. The third interface 86 includes a number of blades, referred to with reference numerals 96-102, which each include a number of output ports, referred to with reference numerals 106-120, and a number input ports, referred to with reference numerals 126-140. The blades 96-102 may be removable items, such as cards. The input ports 126-140 receive signals from the CPE 22 and the CM 24 and the output ports 106-120 send signals to the CPE 22 and the CM 24. The ports 106-140 are preferably radio frequency (RF) ports. The third interface 86 can include any number of blades 96-102 and any number of input and output ports 106-140 without deviating from the scope and contemplation of the present invention.

The CMTS 42 may be configured to output and receive any number of data streams over the ports 106-140, including OOB messaging signals, HSD signals, management layer signals, video signals, and other signals. The CMTS 42 may be configured to support multiple data streams through time or frequency division multiplexed for delivery to the CPE 22 and CM 24. In this manner, multiple data streams may be included on the HFC 18 to facilitate communication with the CPE 22 and the CM 24. Each output port 106-120 is preferably separately configurable such that each output port may output different OOB messaging signals. In this manner, each blade 96-102 may include output ports having the same or different OOB messaging signals.

FIG. 5 illustrates data outputted from one of the output ports 106 in accordance with one aspect of the present invention. Preferably, OOB messaging signals are outputted on data tunnels 150 that are one-way data streams and include instructions to provision, manage, and secure the CPE 22, and which are delivered from the CMTS 42 to the eCM 62 according to protocols defined in the DOCSIS. The OOB messaging signals may assigned to different tunnel types, such as a common broadcast tunnel type 154, a conditional access tunnel type 156, an application data tunnel type 158, a code download tunnel type 160, and an other tunnel type 162. The broadcast tunnel 154 may be used to communicate signals for multiple subscriber stations 20, such as Emergency Alert System (EAS) signals and other standardized messages. The conditional access tunnel 156 may be use to communicate entitlement management messages and the like. The application tunnel 158 may be used to communicate program guide data, such as for electronic programming guides (EPGs). The code download tunnel 160 may be used to deliver new operating codes and updates to the subscriber station 20.

Figure 6:
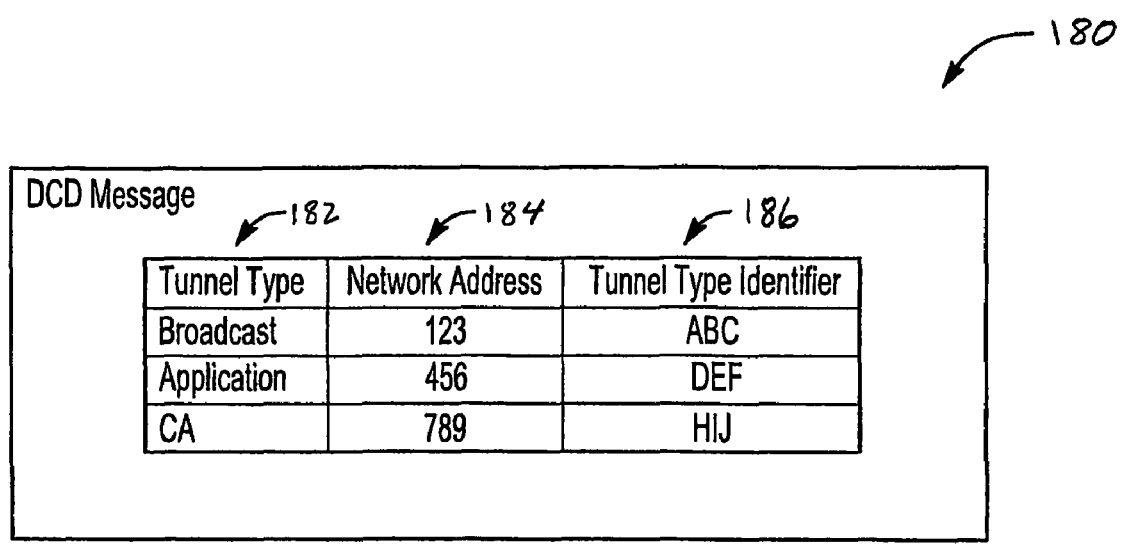
FIG. 6 illustrates a Downstream Channel Descriptor (DCD) message in accordance with one aspect of the present invention.

Referring to FIG. 6, each tunnel type 182 is preferably associated with a unique network address 184, such as a media access control access (MAC) address. The MAC address of each tunnel type 182 may be used by the CPE 22 or other downstream device to locate desired tunnels 154-162. A downstream channel descriptor (DCD) message 180, as shown in FIG. 6, may be outputted over a management layer data stream 166 (FIG. 5), which is preferably separate from the data tunnels 150, for mapping or associating the different tunnel types 182 with their network addresses 184 so that devices located downstream thereof may interpret the DCD message 180 to located desired tunnel types 182.

FIG. 6 illustrates a diagram of the DCD message 180 in accordance with one aspect of the present invention. The illustrated DCD message 180 is in a table format, however, the message 180 may have any form. It includes a tunnel type column 182, a network address column 184, and a tunnel identifier column 186. The tunnel type column 182 identifies the tunnel types of the tunnels identified in the DCD message 180. The network address 184 associated with the tunnel types 182 are shown in the network address column 184. Tunnel identifiers 186 associated with the network address 184 are shown in the tunnel identifier column 186. The tunnel identifiers 186 are unique identifiers associated with each tunnel type 182. The tunnel types 182 are common identifiers, i.e. broadcast, conditional access, application, etc, such that the same DCD message 180 or different DCD message 180 may include the same tunnel type. In contrast, the tunnel identifier 186 is a unique identifier for each tunnel 154-162, regardless of the tunnel type 182 assigned to the tunnel 154-162, such that the tunnel identifier 186 may be used to differentiate between different tunnels 1542-162 identified with the same tunnel type 182. For example, the CMTS 42 may be required to support CPEs 22 of different vendors such that each vendor requires a particular set of conditional access signals. In this case, the conditional access signals are provided through different conditional access tunnels 156, whereby each conditional access tunnel 156 is identifiable by the tunnel identifier 186 associate therewith. In this manner, multiple conditional access tunnels 156 may be used within the system 10 and assigned to different CA units 68 based on the unique tunnel identifier 186, which is preferably referred to as its conditional access identification.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A gateway comprising:
a processor; and
a memory having stored therein computer executable instructions, that when executed by the processor, cause the gateway to perform a method of:
transmitting signals on at least two types of data tunnels for transfer over a network to Customer Premises Equipment (CPE), each data tunnel characterized as a one-way data stream of out-of-band (OOB) messaging signals, where each type of data tunnel is associated with a different type of OOB messaging signal such that different types of data tunnels transfer different types of OOB messages: and
transmitting a downstream channel descriptor (DCD) with a tunnel type, network address, and tunnel type identifier for associating the different types of data tunnels with network addresses and wherein two different tunnels of the same tunnel type have different tunnel type identifiers.

2. The gateway of claim 1 wherein the method further performs: transmitting the OOB messaging signals on at least four types of data tunnels.

3. The gateway of claim 1 wherein at least one of the types of data tunnels is a broadcast tunnel.

4. The gateway of claim 1 wherein at least one of the types of data tunnel is a conditional access tunnel.

5. The gateway of claim 1 wherein at least one of the types of data tunnels is an application tunnel.

6. The gateway of claim 1 wherein at least one of the types of data tunnels is a code download tunnel.

7. The gateway of claim 1 wherein the method further performs:
transmitting the data streams of the data tunnels onto the network on a plurality of output ports in communication with the gateway, wherein each output port includes at least two types of data tunnels.

8. The gateway of claim 7 wherein a first and a second one of the plurality of output ports are associated with different types of OOB messaging signals.

9. The gateway of claim 8 further comprising a plurality of blades, each blade including one or more output ports.

10. The gateway of claim 9 wherein the first and second output ports are located on the same blade.

11. The gateway of claim 9 wherein the first and second output ports are located on different blades.

12. The gateway of claim 1 wherein each data tunnel is identified with a network address.

13. The gateway of claim 1 wherein the OOB messaging signals are transmitted according to protocols defined in a Data Over Cable Service Interface Specification (DOCSIS).

14. The gateway of claim 1 wherein the CPE is a settop box.

15. The gateway of claim 1 wherein the CPE includes an embedded cable modem (eCM) and an embedded settop box (eSTB).

16. The gateway of claim 15 wherein the 00B messaging signals are transferred to the eCM.

17. A cable modem termination system (CMTS), the CMTS comprising:
a gateway configured to output signals on a plurality of data tunnels for transfer over a network to Customer Premises Equipment (CPE), each data tunnel characterized as a one-way data stream of out-of-band (OOB) messaging signals; and
a plurality of output ports for transferring the OOB messaging signals from the gateway to the network, wherein each output port is capable of transferring different OOB messaging signals,
wherein the CMTS outputs a downstream channel descriptor (DCD) with a tunnel type, network address, and tunnel type identifier for associating the different types of data tunnels with network addresses and wherein two different tunnels of the same tunnel type have different tunnel type identifiers.

18. The CMTS of claim 17 wherein each output port includes at least two types of data tunnels.

19. The CMTS of claim 17 wherein a first and a second one of the plurality of output ports are associated with different OOB messaging signals.

20. The CMTS of claim 19 further comprising a plurality of blades, each blade including one or more output ports.

21. The CMTS of claim 20 wherein the first and second output ports are located on the same blade.

22. The CMTS of claim 20 wherein the first and second output ports are located on different blades.

23. A method comprising:
receiving data services information from a data network;
receiving out-of-band signals and application data from a management network;
processing the data services information, out-of-band signals, and application data for transmission; and
transmitting the data services information, out-of-band signals, and application data to Customer Premises Equipment (CPE) on two-way output channels and a plurality of different types of one-way output data tunnels, each different type of out-of-band signal sent on a different type of data tunnel; and
outputting a downstream channel descriptor (DCD) with a tunnel type, network address, and tunnel type identifier for associating the different types of data tunnels with network addresses wherein two different tunnels of the same tunnel type have different tunnel type identifiers.

24. The method of claim 23, wherein processing the data services information, out-of-band signals, and application data comprises converting them from IP packets into digital cable packets.

25. The method of claim 23, further comprising receiving digital cable packets from a subscriber station.

26. The method of claim 25, further comprising converting the digital cable packets to IP packets.

27. The method of 26, further comprising transmitting the IP packets to an internet service provider.

28. The method of claim 23, wherein the tunnel type is a common broadcast tunnel.

29. The method of claim 23, wherein the tunnel type is a conditional access tunnel.

30. A method comprising:
receiving video signals, data services information, out-of-band signals, and application data at Customer Premises Equipment (CPE) on two-way output channels and on a plurality of one-way data tunnels, each different type of out-of-band signal received on a different type of data tunnel;

receiving a downstream channel descriptor (DCD) with a tunnel type, network address, and tunnel type identifier for associating the different types of data tunnels with network addresses wherein two different tunnels of the same tunnel type have different tunnel type identifiers;

transmitting the data services information and out-of-band signals to one or more devices with cable modem functionality; and transmitting the application data and video signals to one or more devices with set-top box functionality.

31. The method of claim 30, wherein the communication of the video signals, data services information, out-of-band signals, and application data is defined by the Data Over Cable Service Interface Specification (DOCSIS).

32. The method of claim 30, wherein the one or more devices with set-top box functionality outputs the video signals and other media signals to a media output device.

33. The method of claim 30, wherein the one or more devices with cable modem functionality processes the out-of-band signals and other non-media signals.

34. The method of claim 33, wherein the one or more devices with cable modem functionality further transmits the out-of-band and the other non-media signals to the one or more devices with set-top box functionality via an internal communications link for processing.

35. The method of claim 30, further comprising providing conditional access control for the subscriber station.

36. An apparatus comprising:
a processor;
a memory having stored therein computer executable instructions, that when executed by the processor, cause the apparatus to perform a method of:
receiving video signals, data services information, out-of-band signals, and application data at Customer Premises Equipment (CPE) on two-way output channels and on a plurality of one-way data tunnels, each different type of out-of-band signal received on a different type of data tunnel;
receiving a downstream channel descriptor (DCD) with a tunnel type, network address, and tunnel type identifier for associating the different types of data tunnels with network addresses and wherein two different tunnels of the same tunnel type have different tunnel type identifiers;
transmitting the data services information and out-of-band signals to one or more devices with modem functionality; and
transmitting the application data and video signals to one or more devices with set-top box functionality.

37. The apparatus of claim 36, wherein the communication of the video signals, data services information, out-of-band signals, and application data is defined by the Data Over Cable Service Interface Specification (DOCSIS).

38. The apparatus of claim 36, wherein the one or more devices with set-top box functionality outputs the video signals and other media signals to a media output device.

39. The apparatus of claim 36, wherein the one or more devices with cable modem functionality processes the out-of-band and other non-media signals.

40. The apparatus of claim 39, wherein the one or more devices with cable modem functionality further transmits the out-of-band and the other non-media signals to the one or more devices with set-top box functionality via an internal communications link for processing.

41. The apparatus of claim 36, where the method further performs providing conditional access control for the subscriber station.

42. A gateway comprising:
a processor; and
a memory having stored therein computer executable instructions, that when executed by the processor, cause the gateway to perform a method of:
transmitting signals on at least two types of data tunnels for transfer over a network to Customer Premises Equipment (CPE), each data tunnel characterized as a one-way data stream of out-of-band (OOB) messaging signals, wherein each type of data tunnel is associated with a different type of OOB messaging signal such that different types of data tunnels transfer different types of 00B messages and wherein a media access control (MAC) address of each tunnel type is used by the CPE to locate a desired tunnel; and
transmitting a downstream channel descriptor (DCD) with a tunnel type, network address, and tunnel type identifier for associating the different types of data tunnels with network addresses and wherein two different tunnels of the same tunnel type have different tunnel type identifiers.

43. A method comprising:
receiving data services information from a data network;
receiving out-of-band signals and application data from a management network;
processing the data services information, out-of-band signals, and application data for transmission; and
transmitting the data services information, out-of-band signals, and application data to Customer Premises Equipment (CPE) on two-way output channels and a plurality of different types of one-way output data tunnels, wherein each different type of out-of-band signal is sent on a different type of data tunnel and wherein a media access control (MAC) address of each data tunnel type is used by the CPE to locate a desired data tunnel; and
outputting a downstream channel descriptor (DCD) with a tunnel type, network address, and tunnel type identifier for associating the different types of data tunnels with network addresses and wherein two different tunnels of the same tunnel type have different tunnel type identifiers.

* * * * *

UNITED STATES PATENT AND TRADEMARK OFFICE
CERTIFICATE OF CORRECTION

| | | |
|---|---|---|
| PATENT NO. | : 7,961,742 B2 | Page 1 of 1 |
| APPLICATION NO. | : 10/570830 | |
| DATED | : June 14, 2011 | |
| INVENTOR(S) | : Kevin N. Taylor et al. | |

It is certified that error appears in the above-identified patent and that said Letters Patent is hereby corrected as shown below:

Column 5, Claim 16, Line 66:
    Please delete "00B" and insert --OOB--

Column 8, Claim 42, Line 24:
    Please delete "00B" and insert --OOB--

Signed and Sealed this
Thirteenth Day of March, 2012

David J. Kappos
*Director of the United States Patent and Trademark Office*